Sept. 13, 1927.  
R. KRASBERG  
1,642,502

FREIGHT HANDLER'S TRUCK

Filed Sept. 28, 1925

Inventor  
Rudolf Krasberg  
By  
Attorney

Patented Sept. 13, 1927.

1,642,502

UNITED STATES PATENT OFFICE.

RUDOLF KRASBERG, OF CHICAGO, ILLINOIS.

FREIGHT-HANDLER'S TRUCK.

Application filed September 28, 1925. Serial No. 59,033.

This invention has for its object to provide a simple, efficient and durable freight handling device, generally termed a "dolly", which is adapted to be assembled and adjusted in width to accommodate the width of the load to be handled and moved and will permit free rotation of the load on its own vertical axis and its deposit in and removal from a comparatively small space.

Devices of this character are used extensively by movers, in warehouses, freight houses, etc.

The invention is illustrated in the accompanying drawings wherein

Figure 1:
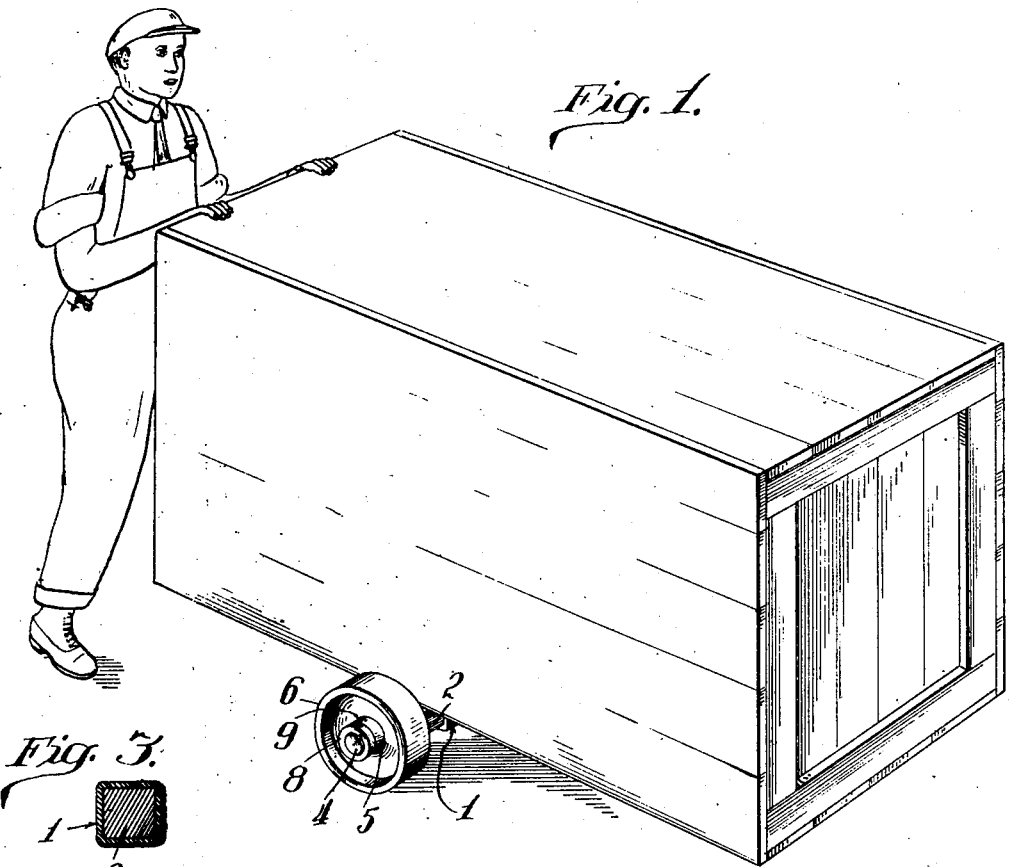
Fig. 1 is a perspective view of a box (representing any kind of a load) supported in balanced position on a dolly constructed in accordance with the invention.
Figure 3:
Fig. 3 is a section on the line 3—3 of Fig. 2.
Figure 2:
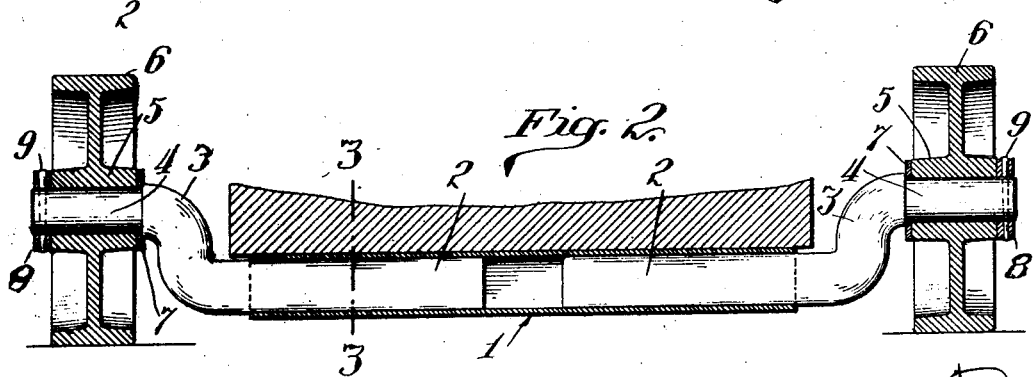
Fig. 2 is a vertical section of the dolly with a fragment of a load supported thereon.
Figure 4:
Fig. 4 is a perspective view of one of the axles of the device.

The device comprises an axle which consists of a middle tubular section 1 of ordinary square tubing, and two end members 2 of square steel rod of a diameter adapted to easily telescope into the tube 1. Each of the members 2 comprises a relatively long shank portion, indicated by reference characters 2, terminating at one end in an ogee curved portion 3 and cylindrical portion 4, the latter being parallel with the shank portion 2 and adapted to fit the bores of the hubs 5 of wheels 6, the said hubs 5 being confined between washers 7 and collars 8. The said collars 8 are mounted on the outer ends of the cylindrical portions 4 of the members 2 and are held against rotation and longitudinal movement relatively thereto by means of the pins 9, so snugly fitting the radial openings in the said collars 8 as to require driving into the same.

The middle portion of the axle depends below the axis of rotation of the wheels 6 thereby enabling the latter to be of relatively large diameter and of such width of tread as to permit of ease of travel and passage over small obstructions and obviate grooving of wood and chipping of concrete floors when transporting heavy loads over the same.

In use the load to be carried by the dolly is lifted at one end and may, if handled by a single operator, be blocked up or supported by a lifting-jack at a sufficient elevation to permit the axle of the dolly to be disposed at substantially the center of gravity of the load. The dolly is then disposed beneath the load by withdrawing one of the shanks 2 from the tube 1 and replacing it while the parts are disposed adjacent the point of support of the raised end of the load. The reassembled dolly is then moved back from this point to as near the center of gravity as the operator can determine and the raised end of the load then lowered until the latter rests on the dolly.

If the position of the latter is such that the operator cannot easily maintain both ends of the load elevated, a readjustment of the position of the dolly is effected but this is rarely necessary when it is used by experienced freight handlers.

When the load is fairly well balanced on the dolly, the operator may easily transport the same, making sharp turns without difficulty. When the load reaches its destination, one end thereof is brought to rest on the floor and the other end then jacked up and supported while the dolly is dissembled and withdrawn.

The width of the dolly may be adjusted by varying, within safe limits, the extent of projection of the shanks 2 into the ends of the tube 1 and by using varying lengths of tubes 1.

A great advantage of the device lies in the fact that in moving loads down inclines, or to rob the same of momentum, sometimes necessary to be imparted thereto to cause the dolly to travel up an incline or over an obstruction, either end of the load may be caused to drag on the floor and thus act as a brake.

I claim as my invention:

1. A dolly comprising a pair of wheels, an axle therefor consisting of a plurality of sections having opposed inner end portions of polygonal cross section telescopically associated with each other and non-rotatable relatively to each other for permitting the spacing of the wheels to be adjusted to the requirements of a load to be supported upon the telescopically associated portions, the latter being disposed below and parallel with the axis of rotation of said wheels.

2. A dolly comprising a pair of wheels, an axle therefor consisting of two end sections and a middle section, said end and middle sections telescopically associated for dismantling and assembly of the device and adjustment of the width thereof, the telescopically interengaging portions of said axle being of polygonal cross-section and disposed below the axis of rotation of said wheels and substantially parallel with said axis.

RUDOLF KRASBERG.